US005567886A

United States Patent [19]

Kettner

[11] Patent Number: 5,567,886

[45] Date of Patent: Oct. 22, 1996

[54] HYDRAULIC IMPULSE SCREWDRIVER PARTICULARLY FOR TIGHTENING SCREW CONNECTIONS

[75] Inventor: Konrad K. Kettner, Aalen-Hofherrnweiler, Germany

[73] Assignee: Cooper Industries, Inc., Houston, Tex.

[21] Appl. No.: 516,327

[22] Filed: Aug. 17, 1995

[30] Foreign Application Priority Data

Aug. 18, 1994 [DE] Germany .......................... 44 29 282.1

[51] Int. Cl.[6] .......................... G02L 5/24

[52] U.S. Cl. .......................... 73/862.23; 73/862.21

[58] Field of Search .......................... 73/862.21, 862.22, 73/862.23, 862.26, 862.338; 81/467, 469, 470

[56] References Cited

U.S. PATENT DOCUMENTS

| | | | |
|---|---|---|---|
| 3,440,928 | 4/1969 | Pauley et al. | 91/59 |
| 3,572,447 | 3/1971 | Pauley et al. | 173/182 |
| 3,858,444 | 1/1975 | Wallace | 73/862.21 |
| 3,920,082 | 11/1975 | Dudek | 73/862.23 X |
| 3,969,960 | 7/1976 | Pagano | 73/862.23 X |
| 4,281,538 | 8/1981 | Dudek | 73/862.21 |
| 4,286,458 | 9/1981 | Alexander | 73/862.21 |
| 4,485,682 | 12/1984 | Stoezel et al. | 73/862.21 X |
| 4,620,449 | 11/1986 | Borries et al. | 73/862.21 |
| 4,648,282 | 3/1987 | Alender et al. | 73/862.338 X |
| 4,759,225 | 7/1988 | Reynertson et al. | 73/862.21 |
| 4,969,105 | 11/1990 | Gaenssle | 73/862.23 X |
| 5,113,949 | 5/1992 | Ohkubo et al. | 73/862.21 X |
| 5,315,501 | 5/1994 | Whitehouse | 73/862.23 X |
| 5,442,965 | 8/1995 | Halen | 73/862.22 |

FOREIGN PATENT DOCUMENTS

| | | |
|---|---|---|
| 0292752B1 | 11/1988 | European Pat. Off. . |
| 2600939 | 7/1977 | Germany . |
| 4218816 | 12/1993 | Germany . |
| 1581101 | 12/1980 | United Kingdom . |

*Primary Examiner*—Richard Chilcot
*Assistant Examiner*—Elizabeth L. Dougherty
*Attorney, Agent, or Firm*—Burns, Doane Swecker & Mathis LLP

[57] ABSTRACT

A hydraulic impulse screwdriver includes a control circuit, a drive shaft, a compressed-air motor having a motor shaft, a compressed air inlet, and an outlet, a striker having a pressurizing cylinder chamber, the striker connected to the outlet of the compressed-air motor for impulse-like driving of the drive shaft, a shut-off device for torque-dependent interruption of the compressed-air inlet to the compressed-air motor, the shutoff device including a servoelement seated in the motor shaft of the compressed-air motor and forming a pressure-carrying link between the pressurizing cylinder chamber of the striker and the shut-off device, by which a torque-related signal is fed to the control circuit, which control circuit interrupts the compressed-air inlet to the compressed-air motor when a specified torque limit value is reached, a bending bar in the shut-off device that is arranged in cooperation with the servoelement, the bending bar being provided with a transducer to determine a bending moment dependent on an impulse pressure in the striker pressurizing cylinder chamber, and an electronic evaluation unit for comparing the bending moment with the specified torque limit value so that the shut-off device is operated when the specified torque limit value is reached.

22 Claims, 1 Drawing Sheet

HYDRAULIC IMPULSE SCREWDRIVER PARTICULARLY FOR TIGHTENING SCREW CONNECTIONS

BACKGROUND OF THE INVENTION

1. Field of the Invention

The invention pertains to a hydraulic impulse screwdriver, and more particularly to a hydraulic impulse screwdriver having a compressed air motor.

2. Description of the Related Art

Impulse screwdrivers are often designed as handtools and are used extensively in different kinds of construction, in particular, for tightening screw connections. In order to assure that a screw connection will withstand the expected stresses, it is preferable that the screw connections be tightened to a specified torque. An insufficient tightening could result in a loosening of the screw connection with the associated danger of damage to the components and accidents. Tightening of the screw connection beyond the specified limiting torque will risk damaging the screw connection itself.

In order to tighten the screws or nuts to a specified torque in the sense of a controlled screw connection, it is known (DE-PS 2,600,939) how to provide a torsion element formed from a number of struts behind the driven motor shaft of the compressed-air motor and to provide a tensiometer at each of the several struts to form a part of a Wheatstone bridge. During operation of the screwdriver to tighten a screw, the reacting torque acting on the screwdriver causes a torsion of the struts about the axis of the screwdriver so that the amount of torsion is proportional to the reacting torque. This reacting torque is essentially equal and opposite to the torque that is applied to the screw. Thus, via the tensiometer and the Wheatstone bridge circuit, an electrical signal is generated that represents the instantaneous torque applied to the screw or the nut, and this electrical signal is compared with a specified limiting torque in order to ultimately turn the screwdriver off when the specified torque is reached. Except for the fact that with regard to the torsion element we are dealing with a mechanically complicated and also heavily worn component, the configuration of this torque-dependent shut-off device is difficult to access within the screwdriver and also leads to a very long design of a screwdriver, so that except for a complicated design of the screwdriver design, its handling is likewise cumbersome.

In another known torque-dependent shut-off device for an impulse screwdriver (EP-B 292,752), a torque setting device is located within the output shaft of the striker. This torque adjusting device is composed of a setting screw and a valve ball/valve seat unit under a load applied by a compression spring. With regard to the compression spring, its force acts on an adjusting rod located in the motor shaft of the compressed-air motor and the adjusting rod actuates a spring-loaded blocking valve for the compressed-air inlet to the compressed-air motor by means of a snap-in element. The shut-off device is located both at the front end of the impulse screwdriver and also behind the compressed-air motor, and as a mechanical structure is exposed to considerable wear and moreover, it is only accessible after some effort, so that this design is certainly in need of improvement.

OBJECTS AND SUMMARY

An object of the invention is to refine an impulse screwdriver of the specified type such that a compact design of the impulse screwdriver is ensured in connection with a torque-dependent shut-off of the screwdriver and also access to the components of the shut-off device is easy.

According to the provisions of the invention, the momentary pressure prevailing in the striker, which builds up during tightening of the screw connection and is proportional with respect to the output torque of the tool, is sent as a force to a bending bar via a servoelement, where the force is absorbed as the bending moment representing the instantaneous torque and is sent to an electronic evaluation unit, in order to make a comparison with a specified limiting torque and, depending on this comparison, shut off the impulse screwdriver. As a result of these measures, an essentially nonwearing adjusting element is realized which requires little physical space and can be readily placed in the housing of an impulse screwdriver. In addition, due to the inventive activity, a savings in weight is also attained, which is very important in handtools. Overall, the measured value transducer together with its output can be held as a unit in a rear part of the housing, where they are also readily accessible.

In a further design of the invention, the bending bar is a radial leg of a support ring for attachment of the bending bar in the rear part of the housing, so that the annulus for the passage of additional operating elements, such as an angle indicator, is available. It is expedient for the counting wheel of this type of angle indicator to be located directly adjacent to the bending bar on the motor shaft of the compressed-air motor, so that a spatial unit for these holding elements is assured. Preferably the adjusting element is designed as an adjusting rod that can be housed very easily as a pressure-transfer connecting element in the output shaft and the motor shaft, and since it acts via a roller bearing preferably on the bending bar, it is barely exposed to any wear.

BRIEF DESCRIPTION OF THE DRAWINGS

One preferred sample design of the invention will be explained below with reference to the figures.

DETAILED DESCRIPTION OF THE PREFERRED EMBODIMENTS

Figure 1:
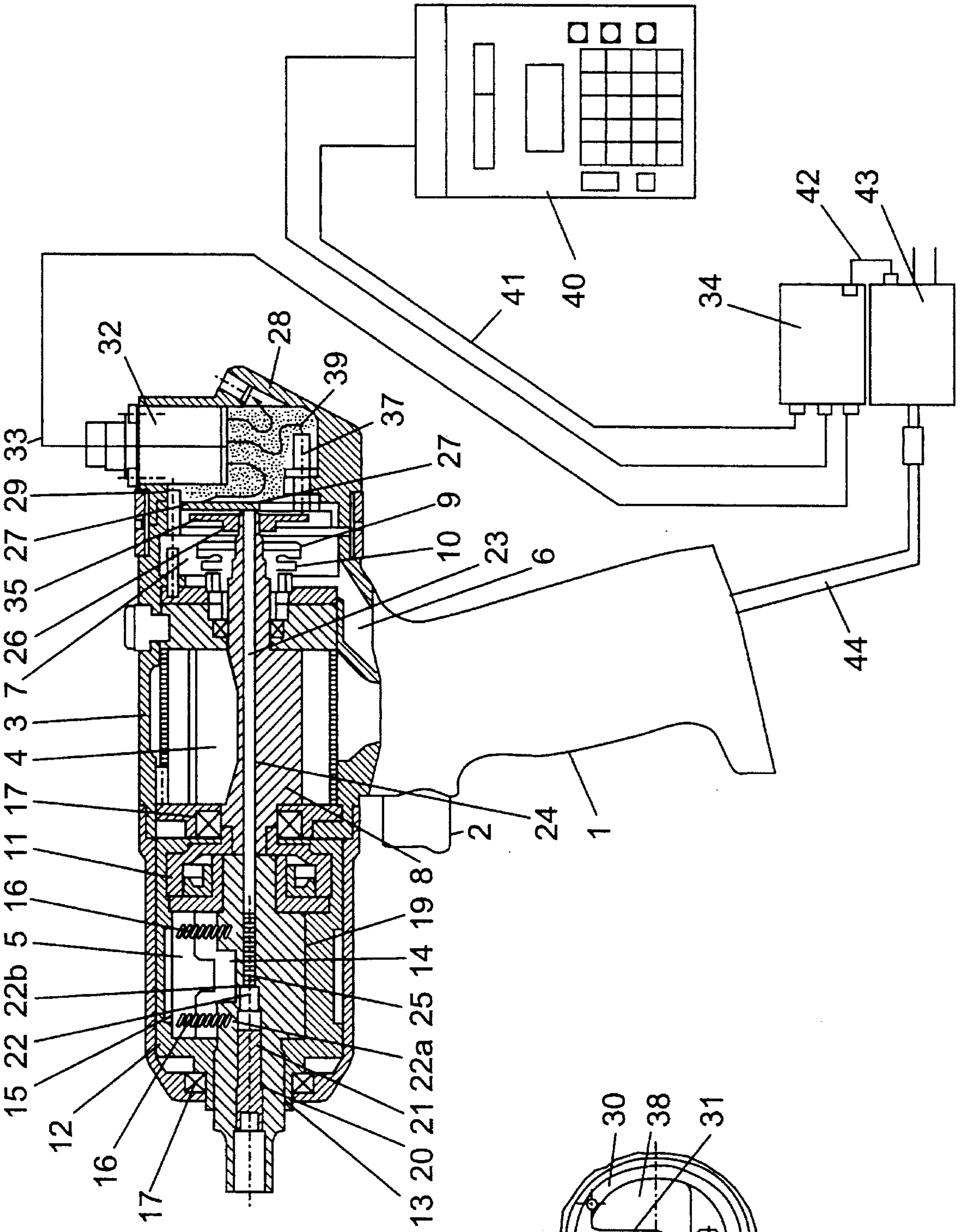
FIG. 1 is a partially cut-away view of an impulse screwdriver according to this invention, with a schematic representation of the measuring electronics.

The impulse screwdriver illustrated in FIG. 1 features a handle 1 with a pushbutton switch 2, with which a tipping valve (not illustrated in the figures) can be operated for the inlet of compressed air. Above the handle 1 there is a compressed-air motor 4 within a housing 3 and an impulse unit 5 is connected to its outlet. A compressed-air inlet 6 opens into a compressed-air chamber 7 in the housing 3, which can be closed by a blocking valve 9 opposite the compressed-air motor 4 seated on a motor shaft 8 against the force of a compression spring 10 surrounding the motor shaft 8. A cartridge-shaped striker cover 11 of the striker 5 sits on the end turned away from the blocking valve 9. The striker 5 is permanently connected to the motor shaft 8. This striker cover 11 is permanently attached to an opposing, cylindrical striker cover 12 and rotates with it. The cover 12 is seated on an output shaft 13 of the striker 5. The output shaft 13 ends a short distance from the motor shaft 8 aligned axially with it.

The striker covers 11 and 12 bound a cylinder chamber 14, between them which is eccentrically located in the cylinder of the striker 5 bounded by the striker covers 11 and 12. The output shaft 13 passes through this cylinder chamber 14 and is located in a conventional manner eccentrically with respect to the axis of this cylinder chamber 14. To form this striker, a bar 15 is located in the output shaft 13 in a radially displaceable manner, and this bar is under the force of two compression springs 16 which press the bar 15 radially outward against the cylindrical wall of the striker cover 12.

The output shaft 13 is rotatably seated with roller bearings 17 in the housing, which surrounds the cylindrical mantle of the striker cover 12 by forming an annular gap 19. At the front end, the output shaft 13 holds a tool (not illustrated in the figures), for example, a chock for screwdriver bits.

The cylinder chamber 14 is divided by the bar 15 in a known manner into two chambers (not illustrated in detail), where the cylinder chamber 14 is completely filled with a pressure medium, preferably with pressure oil.

To start the impulse screwdriver, the pushbutton switch 2 is pressed so that compressed air will move into the compressed-air chamber 7 and from there via the opened blocking valve 9 to the compressed-air motor 4, so that it will be driven in a known manner. The motor shaft 8 of the compressed-air motor 4 then drives the striker cover 11, 12. Via the compressed oil located in the cylinder chamber 14, the output shaft 13 will be rotated. Thus, the tool held at the front end of the output tool 13 is rotated, so that the screw or nut can be screwed into the particular component. As long as the screw head or the nut is not yet flush, the motor shaft 8 and the output shaft 13 will turn together. But as soon as the screw head or the nut is tight, then an opposing force acts on the output shaft 13 so that to continue tightening of the screw or the nut it is now necessary that the output shaft 13 apply a torque to the screw or the nut. Since the motor shaft 8 with the striker covers 11 and 12 is rotary mounted with respect to the output shaft 13, the motor shaft 8 will continue to be driven, so that the striker covers 11 and 12 turn relative to the output shaft 13.

As a result of the eccentric placement of the output shaft 13 in the cylinder chamber 14 and the seals provided in a known manner in the interior of the cylinder chamber 14, the cylinder chamber 14 is organized into the two working chambers described above, which are sealed from each other by the bar 15 and the output shaft 13. Thus, the hydraulic medium is placed under pressure in one of the working chambers, since the pressure medium cannot get into the other working chamber. The pressure building up in this case is transferred to the portion of the output shaft 13 located in the cylinder chamber 14. Thus, the output shaft will be rotated in a known manner jerkily in the rotary direction of the striker cover 12. As soon as the above-mentioned sealing strips are passed, the hydraulic medium moves from the one working chamber to the other working chamber, where finally a sealed position is again reached, so that in a known manner, the output shaft 13 is turned in an impulse-like fashion.

Figure 2:
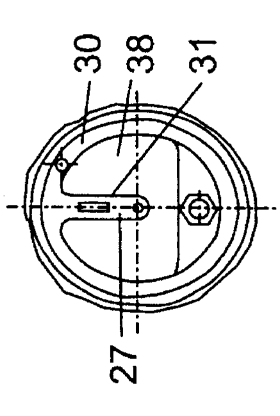
FIG. 2 is a partial view of FIG. 1 showing the bending bar from the front view, which is a part of the shut-off device.

Since, in a controlled tightening of the screws or the nuts, they may only be tightened to a specified torque, the screwing process must be terminated when this specified limiting torque is reached. In this case, the pressure building up in the cylinder chamber 14 in the sealed position of the output shaft 13 is used to determine the shut-off timepoint at the specified limiting torque. In this case, the impulse screwdriver is provided with a torque setting device 20 which is formed by an adjusting screw 21 which is screwed into a coaxial threaded hole of the output shaft 13. The adjusting screw 21 can be easily operated from the outside by adjusting the shut-off timepoint of the screwdriver with a screwdriver tool. The nonthreaded section of the adjusting screw 21 extends into a drilled hole 22 passing centrally through the output shaft 13. In an additional centrally drilled hole 24, placed in the output shaft 13 and the motor shaft 8 from the opposite side, there is an adjusting rod 23 which presses against a bending bar 27 with a compression spring 25 loaded via a ball 26. The compression spring 25 is used for tolerance compensation of the depth of the hole and to compensate for the air pressure acting from the compressed-air chamber 7 onto the adjusting rod 23. The hydraulic pressure building up in the cylinder chamber 14 acts via the drilled holes *22a*, 22, and *22b* on the adjusting rod 23 and via the ball 26 on the bending bar 27, which is securely braced in a rear housing part 28 attached to the housing 3. This bending bar 27, as is best shown in FIG. 2, is a component of a ring 30 held in place via a pin 29 at the housing part 28 and in this case forms a radial leg of this ring 30. Preferably on the side of the bending bar 27 turned away from the striker 5 a measured value transducer 31 is attached, in particular, glued, provided as a type of strain gauge, whose signal line runs to a cable tree 33 held in a packing box 32, which leads to an electronic switching element 34. One of the measured value transducers absorbs tensile stresses, and the other absorbs compressive stresses. The spring 25, which can be braced against another component of the impulse screwdriver, is also used to keep the rod and ball always in contact with the bending bar.

At the end of the motor shaft 8 at a distance from the striker 5, there is a disk-like counting wheel 35 located immediately adjacent to the bending bar 27 and is attached to the motor shaft and rotates with it. This counting wheel 35 cooperates with a rod-like sensor 37 held securely against a flange in the housing part 28. The sensor 37 passes through the annulus 38 of the ring 30 featuring the bending bar 27. With the result of the angle indicator, the angle of rotation of the screw or nut can be determined while screwing it in. The sensor 37 is connected via a signal line 39 with the packing box 32 and is run to the cable tree 33. It is evident that the bending bar 27, including the attaching ring 30, the sensor 37, and the signal lines, are placed in the rear housing part 28 in a space-saving and easily accessible manner. When the rear housing part 28 is removed, an easy access to the counting wheel 35 is possible.

The end of the adjusting rod 23 facing the impulse striker 5 against which the compression spring 25 is braced, has a pressure-agent connection via the above-mentioned drill holes, with the cylinder chamber 14, so that the pressure building up in the cylinder chamber 14 during the screwing process will be applied to the adjusting rod 23, which is pressed more or less at a distance in the direction of the bending bar 27, on the amount of pressure, where the pressure applied to the front end of the adjusting rod 23 or the force acting on the bending bar 27 is absorbed as torque by the strain gauge 31. These pressure-dependent bending moments are sent along the line into the cable tree 33 and are fed via the switching element 34 to an electronic control unit 40, where the determined bending moment is compared with a specified limiting torque for the screw connection. When the specified limiting torque is reached, a signal is sent along the line 41 to the switching element 34, which operates an electromagnetic control valve 43 via a control line 42, via which the compressed-air inlet to the compressed-air motor 4 is interrupted via the line 44 and the impulse screwdriver is immediately shut off.

After turning off the compressed-air motor 4, the drive shaft 13 will stop for a moment, so that actually at the desired limiting torque, the screwdriver will be stopped, so that the screw or nut being tightened, will not be overtightened. After the shut-off, a pressure drop will occur in the cylinder chamber 14 and in the compressed-air chamber 7, so that the parts causing the shut-off of the screwdriver are again pushed back into their starting position. In this case, the compression spring 10 pushes the blocking valve 9 back into its release position. Thus, the screwdriver is ready for the next screwdriving process.

At the same time, via the angle of rotation indicator 35 and 37, an angular counting will occur, so that to increase the dependability of correct tightening of a screw connection, the torque and the angle of rotation can be used. In this case, the angle of rotation and torque at the shut-off timepoint can be compared with a window-specified by a maximum and minimum torque and by a certain, predetermined angle of rotation, whereby the circuit generates a light signal of a particular color or a signal tone, when the shut-off timepoint is located in the defined window.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A hydraulic impulse screwdriver, comprising:

a control circuit, a drive shaft, a compressed-air motor having a motor shaft, a compressed air inlet, and an outlet, a striker having a pressurizing cylinder chamber, said striker connected to the outlet of the compressed-air motor for impulse-like driving of the drive shaft, a shut-off device for torque-dependent interruption of the compressed-air inlet to the compressed-air motor, the shutoff device including a servoelement seated in the motor shaft of the compressed-air motor and forming a pressure-carrying link between the pressurizing cylinder chamber of the striker and the shut-off device, by which a torque-related signal is fed to the control circuit, which control circuit interrupts the compressed-air inlet to the compressed-air motor when a specified torque limit value is reached, a bending bar in the shut-off device that is arranged in cooperation with said servoelement, the bending bar being provided with a transducer to determine a bending moment dependent on an impulse pressure in the striker pressurizing cylinder chamber, and an electronic evaluation unit for comparing the bending moment with the specified torque limit value so that the shut-off device is operated when said specified torque limit value is reached.

2. The impulse screwdriver according to claim 1, wherein the bending bar is a radial leg of a fixed ring located in a rear housing part of the compressed-air motor, by which fixed ring the bending bar is attached in the rear housing part.

3. The impulse screwdriver according to claim 1, wherein the servoelement is an adjusting rod which is located in a drilled hole of the drive shaft and in a drilled hole of the motor shaft of the compressed-air motor aligned axially with the drilled hole of the drive shaft, and an end of the adjusting rod facing the compressed-air motor acts on the bending bar.

4. The impulse screwdriver according to claim 2, wherein the servoelement is an adjusting rod which is located in a drilled hole of the drive shaft and in a drilled hole of the motor shaft of the compressed-air motor aligned axially with the drilled hole of the drive shaft, and an end of the adjusting rod facing the compressed-air motor acts on the bending bar.

5. The impulse screwdriver according to claim 1, further comprising a roller bearing between the servoelement and the bending bar, wherein the servoelement acts on the bending bar through the roller bearing.

6. The impulse screwdriver according to claim 5, wherein the roller bearing is a rotary mounted ball.

7. The impulse screwdriver according to claim 3, further comprising a compression spring and an adjusting screw, wherein the adjusting rod is connected by its end standing under pressure connection with the striker pressurizing cylinder chamber with the adjusting screw for setting the torque limit via the compression spring.

8. The impulse screwdriver according to claim 2, further comprising a rod-like sensor, wherein on the motor shaft directly before the bending bar, there is an angle indicator having a disk-shaped counter wheel of an angle indicator for measuring an angle at which the rod-like sensor passes through an annulus of the ring holding the bending bar.

9. The impulse screwdriver according to claim 8, wherein the angle indicator and the bending bar are located in the rear housing part of the impulse screwdriver, by which signal lines of the bending bar and the angle indicator are fed to an electronic control unit.

10. The impulse screwdriver according to claim 9, wherein the electronic control unit is located externally of the impulse screwdriver.

11. The impulse screwdriver according to claim 9, wherein the electronic control unit is located inside the impulse screwdriver.

12. The impulse screwdriver according to claim 1, wherein a strain gauge is located on both sides of the bending bar.

13. A hydraulic impulse screwdriver, comprising:

a drive shaft, a compressed-air motor having a compressed air inlet and an outlet, a striker connected to the outlet of the compressed-air motor for driving of the drive shaft, a shut-off device for torque-dependent interruption of the compressed-air inlet to the compressed-air motor, the shutoff device including a servoelement forming a pressure-carrying link between the striker and the shut-off device, a control circuit for receiving a torque-related signal from the shut-off device, which control circuit interrupts the compressed-air inlet to the compressed-air motor when a specified torque limit value is reached, a bending bar in the shut-off device that is arranged in cooperation with said servoelement, the bending bar being provided with a transducer to determine a bending moment dependent on an impulse pressure from the striker, and an electronic evaluation unit for comparing the bending moment with the specified torque limit value so that the shut-off device is operated when said specified torque limit value is reached.

14. The impulse screwdriver according to claim 13, wherein the bending bar is a radial leg of a fixed ring located in a rear housing part of the compressed-air motor, by which fixed ring the bending bar is attached in the rear housing part.

15. The impulse screwdriver according to claim 13, wherein the servoelement is an adjusting rod which is located in a drilled hole of the drive shaft and in a drilled hole of a motor shaft of the compressed-air motor aligned axially with the drilled hole of the drive shaft, and an end of the adjusting rod facing the compressed-air motor acts on the bending bar.

16. The impulse screwdriver according to claim 14, wherein the servoelement is an adjusting rod which is located in a drilled hole of the drive shaft and in a drilled hole of a motor shaft of the compressed-air motor aligned axially with the drilled hole of the drive shaft, and an end of the adjusting rod facing the compressed-air motor acts on the bending bar.

17. The impulse screwdriver according to claim 13, further comprising a roller bearing between the servoelement and the bending bar, wherein the servoelement acts on the bending bar through the roller bearing.

18. The impulse screwdriver according to claim 17, wherein the roller bearing is a rotary mounted ball.

19. The impulse screwdriver according to claim 15, further comprising a compression spring and an adjusting screw, wherein the adjusting rod is connected by its end standing under pressure connection with the striker with the adjusting screw for setting the torque limit via the compression spring.

20. The impulse screwdriver according to claim 15, further comprising a rod-like sensor, wherein on the motor shaft directly before the bending bar, there is an angle indicator having a disk-shaped counter wheel of an angle indicator for measuring an angle at which the rod-like sensor passes through an annulus of the ring holding the bending bar.

21. The impulse screwdriver according to claim 20, wherein the angle indicator and the bending bar are located in a rear housing part of the impulse screwdriver, by which signal lines of the bending bar and the angle indicator are fed to an electronic control unit.

22. The impulse screwdriver according to claim 13, wherein a strain gauge is located on both sides of the bending bar.

* * * * *